US010395166B2

(12) United States Patent
Harrison et al.

(10) Patent No.: US 10,395,166 B2
(45) Date of Patent: Aug. 27, 2019

(54) SIMULATED INFRARED MATERIAL COMBINATION USING NEURAL NETWORK

(71) Applicant: Lockheed Martin Corporation, Bethesda, MD (US)

(72) Inventors: Gregory Anthony Harrison, Oviedo, FL (US); Nickolaos Petris, Orlando, FL (US); Keith A. Stump, Winter Springs, FL (US); James Kevin O'Malley, Jr., Orlando, FL (US); Joel Peters, Orlando, FL (US); Walter Joseph Wojciechowski, Windermere, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 943 days.

(21) Appl. No.: 14/477,560

(22) Filed: Sep. 4, 2014

(65) Prior Publication Data

US 2015/0066825 A1    Mar. 5, 2015

Related U.S. Application Data

(60) Provisional application No. 61/873,543, filed on Sep. 4, 2013.

(51) Int. Cl.
*G06K 9/00*  (2006.01)
*G06N 3/04*  (2006.01)
*G06K 9/28*  (2006.01)

(52) U.S. Cl.
CPC ....... *G06N 3/0436* (2013.01); *G06K 9/00577* (2013.01); *G06K 9/28* (2013.01); *G06N 3/0409* (2013.01)

(58) Field of Classification Search
CPC .................. G06N 3/0436; G06K 9/00577
See application file for complete search history.

(56) References Cited

U.S. PATENT DOCUMENTS

| | | | | |
|---|---|---|---|---|
| 6,473,090 | B1 * | 10/2002 | Mayer | G06T 15/04 345/582 |
| 2006/0018565 | A1 * | 1/2006 | Davidson | G06K 9/0063 382/312 |

(Continued)

OTHER PUBLICATIONS

Carpenter, Gail A., et al. "Fuzzy ARTMAP: A neural network architecture for incremental supervised learning of analog multidimensional maps." IEEE Transactions on neural networks 3.5 (1992): 698-713.*

(Continued)

*Primary Examiner* — Scott A. Waldron
*Assistant Examiner* — Kevin W Figueroa
(74) *Attorney, Agent, or Firm* — Oblon, McClelland, Maier & Neustadt, L.L.P.

(57) ABSTRACT

Mipping systems and methods are disclosed. For example, a mipping system can include processing circuitry configured to receive combinations of a plurality of pixels N at a time, each pixel having material codes directed to respective materials of the pixels, where the material codes relate to infrared properties of the respective materials, and N is a positive integer greater than 1; and train an artificial neural network having a classification space by providing respective neurons for each unique combination of material codes, and condition the artificial neural network so that the respective neurons activate when presented with their unique of material code combinations in order to create a combined set of material code parameters for accurate rendering of the mipped pixels.

24 Claims, 10 Drawing Sheets

(56) References Cited

U.S. PATENT DOCUMENTS

| | | | | |
|---|---|---|---|---|
| 2007/0284448 A1* | 12/2007 | Wang | ................ | G06K 7/10722 235/462.45 |
| 2010/0054593 A1* | 3/2010 | Matsushita | .......... | G06K 9/4671 382/167 |
| 2012/0081387 A1* | 4/2012 | Messmer | ............. | G09G 3/3426 345/591 |

OTHER PUBLICATIONS

Carpenter, Gail A., Stephen Grossberg, and John H. Reynolds. "A fuzzy ARTMAP nonparametric probability estimator for nonstationary pattern recognition problems." IEEE Transactions on Neural Networks 6.6 (1995): 1330-1336. (Year: 1995).*

\* cited by examiner

SIMULATED INFRARED MATERIAL COMBINATION USING NEURAL NETWORK

INCORPORATION BY REFERENCE

This application claims the benefit of U.S. Provisional Application No. 61/873,543 entitled "SIMULATED INFRARED MATERIAL COMBINATION USING NEURAL NETWORK" filed on Sep. 4, 2013, the content of which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In a process called "mipping" or sub-sampling, a lower resolution version of a visual scene is created. This may be performed in order to use less memory when viewing a complicated scene from a distance. There may be multiple levels of mipping. For example, in one form, four adjacent pixel colors are joined together to make one pixel having an average color of the four original pixels while in another form nine pixels are joined together to make one pixel having an average color of the nine original pixels.

In the use of Infrared (IR) materials, however, pixels are processed differently according to a concept known as "Material Coded Imagery" (MCI) which uses codes to represent different types of materials having different IR properties. Mipping in the infrared does not combine/average different pixel colors as with visual mipping, but derives a single "material code" out of a set of known material codes having suitable properties that an infrared heating and image generation (sensor simulation) system uses to produce an image that looks correct from a distance and that can change into the individual elements as the view becomes closer.

SUMMARY

Various aspects and embodiments of the invention are described in further detail below.

In an embodiment, a mipping system includes processing circuitry configured to: receive combinations of a plurality of pixels N at a time, each pixel having material codes directed to respective materials of the pixels, where the material codes relate to infrared properties of the respective materials, and N is a positive integer greater than 1; and train an artificial neural network having a classification space by providing a set of neurons that will recognize each unique combination of material codes, and condition the artificial neural network so that the respective neurons activate when presented with their unique material code combinations.

In another embodiment, a mipping method includes receiving combinations of a plurality of pixels N at a time, each pixel having material codes directed to respective materials of the pixels, where the material codes relate to infrared properties of the respective materials, and N is a positive integer greater than 1; and training an artificial neural network having a classification space by providing respective neurons for each unique combination of material codes, and conditioning the artificial neural network so that the respective neurons activate when presented with their unique of material code combinations.

In yet another embodiment, an imaging device includes circuitry configured to process a plurality of input pixels taken N at a time using a pre-trained artificial neural network to create an output pixel for each N input pixels, wherein the input pixels and the output pixel all include infrared information and more than three dimensions, each pixel having a respective material code chosen from material codes of a classification space; wherein N is a positive integer more than 1.

In still another embodiment, an imaging method includes receiving a plurality of pixels that each include infrared information and more than three dimensions, each pixel having a respective material code chosen from material codes of a classification space; and processing the pixels using a pre-trained artificial neural network to create an output pixel having a material code of the classification space and infrared information.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

The disclosed methods and systems below may be described generally, as well as in terms of specific examples and/or specific embodiments. For instances where references are made to detailed examples and/or embodiments, it is noted that any of the underlying principles described are not to be limited to a single embodiment, but may be expanded for use with any of the other methods and systems described herein as will be understood by one of ordinary skill in the art unless otherwise stated specifically.

A pixel is the fundamental unit of an image used in computer graphics. A texel (also known as a texture element, or texture pixel) is the fundamental unit of texture space.

Textures are represented by arrays of texels, just as pictures are represented by arrays of pixels. "Mipping" refers to the combination of multiple pixels or texels into a 'sub-sampled' pixel/texel. Thus, for instance, four pixels/texels can be combined into one to create a view from a further distance.

For the purpose of this disclosure, the term "pixel" is to include pixels, texels or any other entity capable of representing an image.

Further, the 'property boundaries' (or 'material codes') of a single material is a point (or "hyper-point" or "hyper-dimensional point" if the material is described in more than three dimensions). Each material has only one value albeit that value is described in multiple dimensions. Generally, there is no range of settings per material. When materials are combined and presented to a neural network, each combination is also a hyper-point. However, it is to be recognized that, upon the application of fuzzy logic or some other fuzzy recognition process, a hyper-point may be subsumed within a 'hyper-range' or 'hyper-rectangle" (more than three dimensions).

Figure 2A:
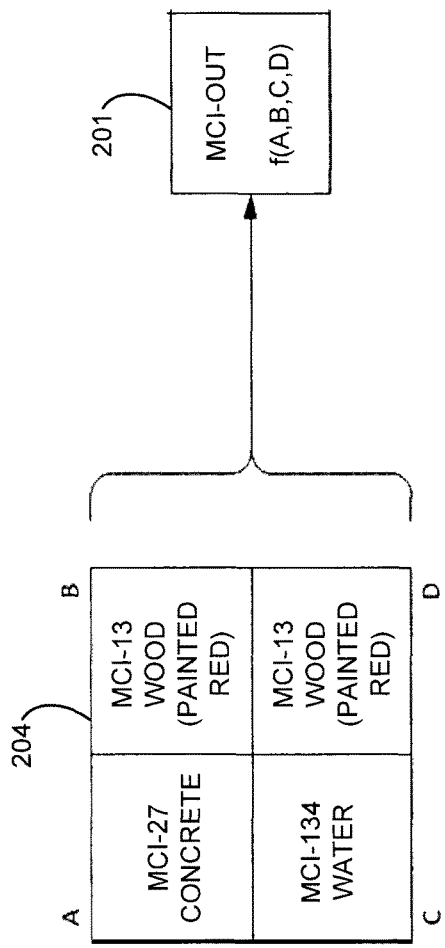
FIGS. 2A and 2B depict examples of "mipping."
Figure 2B:
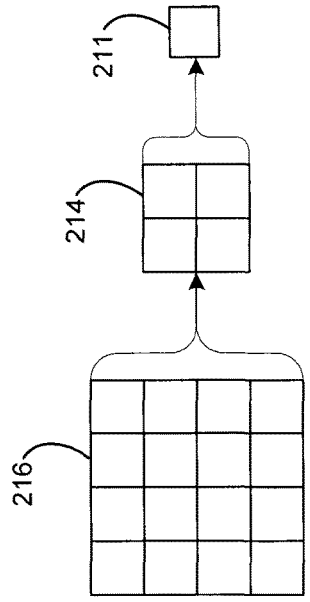

FIGS. 2A and 2B depict examples of mipping different materials. FIG. 2A is provided to indicate that a collection of pixels 204 of different materials each having different Material Coded Imagery (MCI) identifier/code can be combined into an output pixel 201 having an MCI identifier/code that is an amalgam of the collection of pixels 204. FIG. 2B is provided to indicate that collection of pixels can range greatly. That is, the output pixel 211 of FIG. 2B can be constructed, for example, from a set of sixteen contiguous pixels 216 as well as a set of four contiguous pixels 214. FIG. 2B also shows that there may be multiple levels of mipping, to portray imagery at different distances from the observation point, for instance. The four mipped pixels at 214 maybe further mipped to the single mipped, or multi-mipped, pixel at 211. While the examples below will be limited to four pixels used to create an output pixel, in practice any number N of pixels (N being a positive integer greater than 1) can be mipped to create a lower-resolution output pixel.

Figure 1:
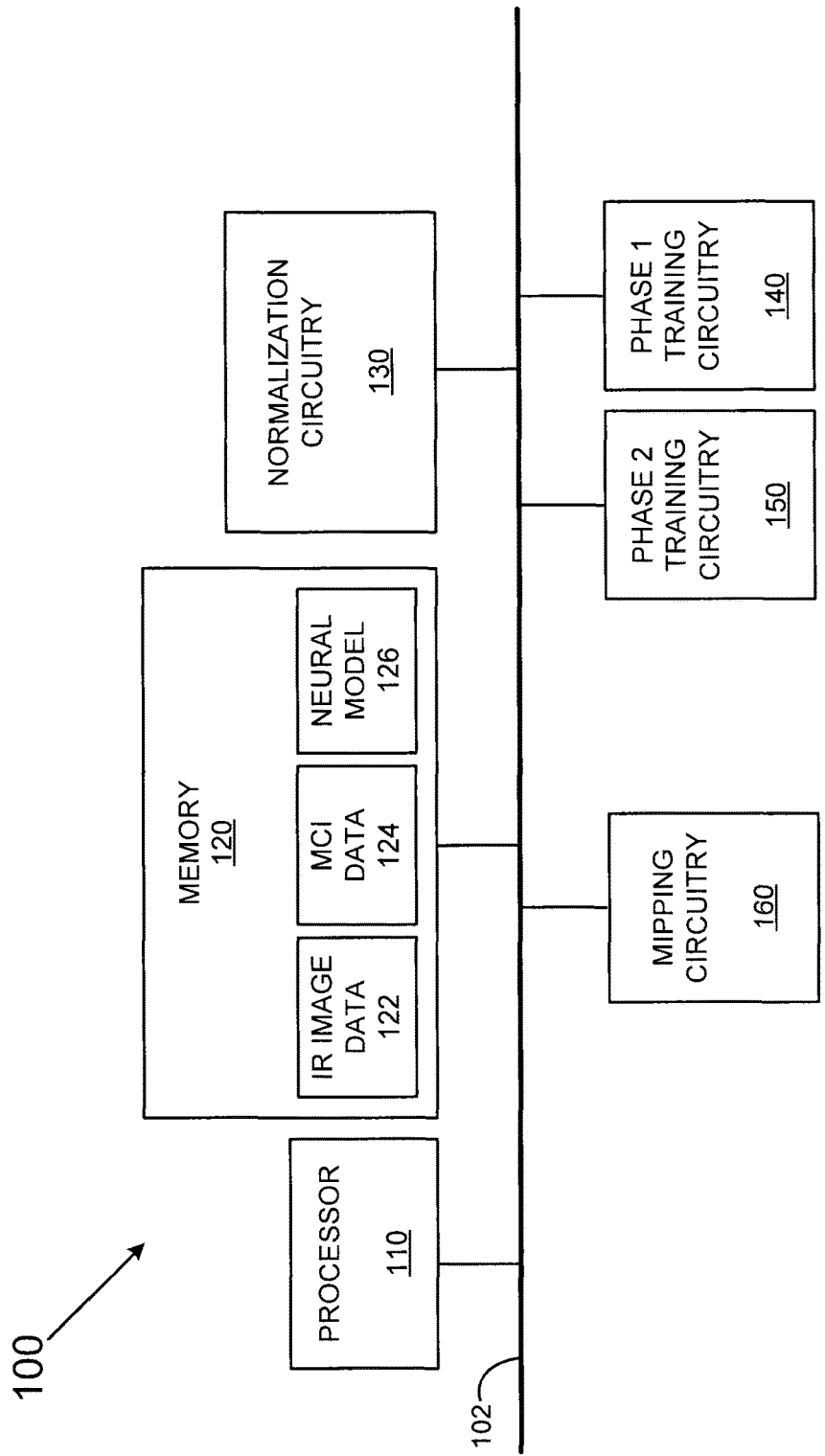
FIG. 1 is a block diagram of an example of a neural processing system configured to train and use neural networks to 'mip' infrared visual data.

FIG. 1 is a block diagram of an example of a neural processing system 100 configured to train and use neural networks to 'mip' infrared visual data. As shown in FIG. 1, the neural processing system 100 includes a processor 110, a memory 120, normalization circuitry 130, phase 1 training circuitry 140, phase 2 training circuitry 150 and mipping circuitry 160. Within the memory 120 includes Infrared (IR) image data 122, Material Code Information (MCI) data 124 for a variety of different materials (e.g., painted objects, water and concrete), and a neural model 126. The above components 110-160 are coupled together with control/data bus 102. Although the example of FIG. 1 uses a bussed architecture controlled by a sequential instruction device, it is to be appreciated that there is a wide range of other architectures capable of performing equivalent tasks, such as a collection of dedicated gates/circuits hardwired to one another using dedicated data and control lines, a collection of different computer-based processing systems, and so on.

Figure 3:
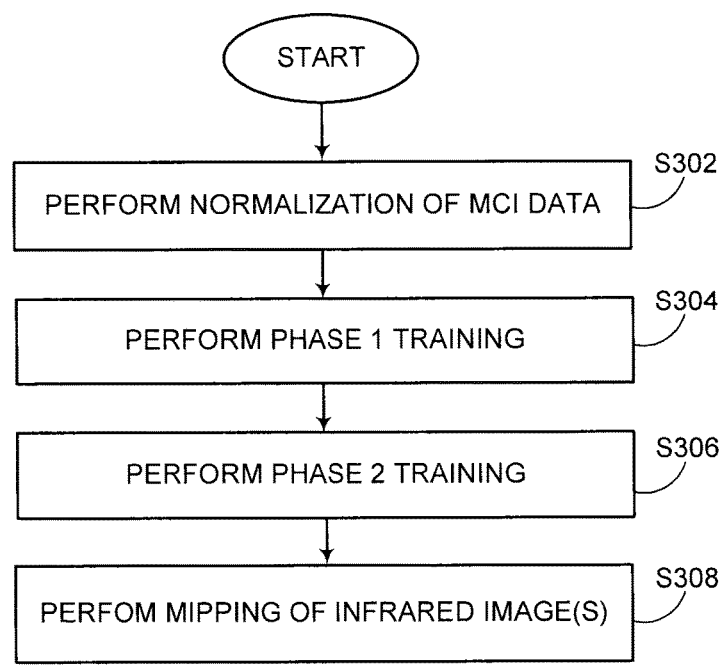
FIG. 3 is a flowchart outlining an example set of operations for training and using an artificial neural network to mip infrared image data.

FIG. 3 is a flowchart outlining the general operation of the processing system of FIG. 1 and includes the operations of normalization of MCI data (S302), performing phase 1 training (S304), performing phase 2 training (S306) and performing mipping operations of infrared images using the resulting neural network (S308).

Returning to FIG. 1, under control of the processor 110, the normalization circuitry 130 performs preprocessing and standardization/normalization processes on the MCI data 124.

Preprocessing and Standardization/Normalization:

As discussed above, a set of infrared materials can be used to create new materials from their combination, or to select one from the combination of the existing materials that best represents the combination. This is accomplished by training the neural network 126 using all combinations of materials in order to allow the neural network 126 to return the closest match in materials putting into considering many dimensions of physical properties that represent the materials.

In order to make the input information be in the correct form for input to the neural network 126, preprocessing can be used to standardize/normalize all the features of all the individual material properties and combined material properties such that the maximum and minimum values of all the dimensions are adjusted so that: Maximum value=1.0 and Minimum value=0.0.

In the present embodiment, for the materials processed, 118 dimensions were chosen, which include:
  Material Density
  Material Emissivity
  Specific Heat
  Thermal Conductivity
  Season of the year
  Geometry information 1
  Geometry information 2
  Geometry information 3
  Reflectivity: (110 different spectral ranges)

Each of these 118 dimensions has different magnitudes for a given material. Assuming that 134 different materials are used and combining them in groups of four to mip to a single material at a time generates a large number of possible combinations. All dimensions of each combination need to be checked for a maximum or minimum value for correct standardization/normalization. Normalization enables neural comparisons using valid levels throughout system processing.

With M=134 materials and r=4 combined materials in one mipped material, there are $$\binom{r+M-1}{r}$$

combinations of M possible Material Coded Imagery (MCI) types, taken r ways, with re-use irrespective of order. For example, if only materials 51 and 76 are used, the following combinations would be made: {51, 51, 51, 51}, {51, 51, 51, 76}, {51, 51, 76, 76}, {51, 76, 76, 76}, and {76, 76, 76, 76} since order does not matter. There are thus $$\binom{4+134-1}{4} = \binom{137}{4} = 14,043,870$$

input patterns to be considered to obtain the normalization maximum and minimum values for the example embodiment.

Figure 4:
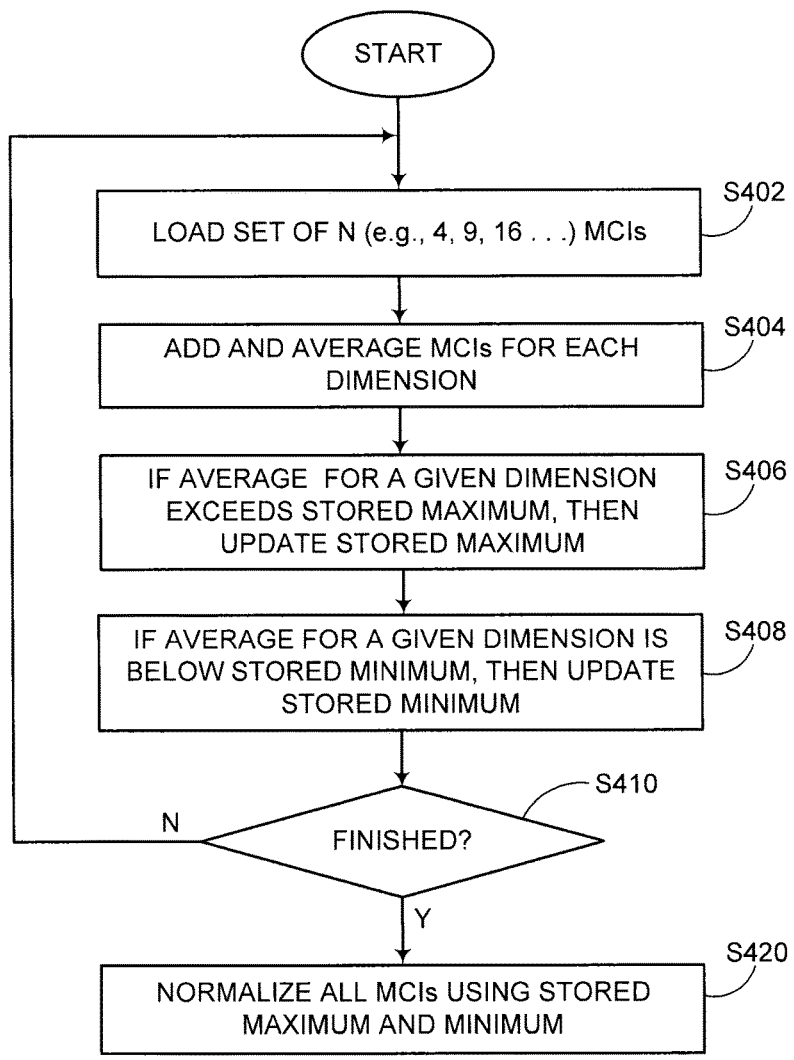
FIG. 4 is a flowchart outlining an example set of operations for normalizing material coded information (MCI) codes.

FIG. 4 is a flowchart outlining the MCI normalization process. While the below-described steps are described as occurring in a particular sequence for convenience, it is noted that the order of various operations may be changed from embodiment to embodiment. It is further noted that various operations may occur simultaneously or may be made to occur in an overlapping fashion. The process starts in S402 where a set of N MCIs are loaded. Next, in S404, for each dimension the MCIs are added and averaged. Control continues to S406.

In S406, if an average for a particular dimension exceeds a stored maximum value, then the stored maximum value is replaced with the average value. In S408, if an average for a particular dimension falls below a stored minimum value, then the stored minimum value is replaced with the average value. In S410, a determination is made as to whether all MCI combinations have been considered. If all MCI combination have not been considered, then control jumps back to S402 where the next set of N MCIs are loaded; otherwise, control continues to S420 where all possible (in this example 14,043,870) combinations are created and the global normalization stored minimum and maximum values are adjusted such that: $0.0 \leq MCI$ combined value dimension $\leq 1.0$.

Returning again to FIG. 1, after the normalization circuitry 130 has determined the normalization values for the MCI data combinations, the phase 1 training circuitry 140 performs a number of training operations upon the neural model 126 using standardized/normalized MCI data 124.

Phase 1 training is a supervised training technique, in that the input pattern also has a specific desired output result or classification that is presented to the network. The network learns both the input pattern and its classification. In this example, each output/classification is a material ID from a set of the pre-existing infrared materials.

However, in other embodiments each output/classification can vary to be, for instance, a material ID from a subset of the pre-existing infrared materials or from an expanded set of "synthesized materials." In synthesized-materials mode, new materials may be made by the neural network 126 to provide intermediate materials that better represent combinations of material in a mip, the mip being a combination of multiple materials that is being represented by a single material. During phase 1 training, neurons are generated/spread across the neural network 126 to represent the combined feature sets of the incoming set of r materials, through the operation of the neural network. The neural network 126 will automatically create neurons when needed, in order to represent the combined materials, when they do not sufficiently resonate with any of the existing material-coded neurons. These new neurons will represent a new material that may be used as the mipped material. Each newly-created material would be a hyper-point that exactly represents the material properties.

In a non-limiting example, the neural network 126 is a Fuzzy Adaptive Resonance Technology network, or "Fuzzy ART." The particular network paradigm used in this system has additional features that: allow the storing of an MCI number or set of numbers in an individual neuron, tagging it (without using a FuzzyARTMAP system); allow the learning capabilities of specific neurons to be enabled or disabled; reading out the internal neuron prototype values as a solution, as the final MCI parameter values after de-normalization; the hybrid supervised/unsupervised training methodology used to train the neural network with the phase 1 and phase 2 training is also novel; varying the strength of the contribution of a certain dimension to the vigilance calculation is also novel. Such a neural network paradigm normally would create neurons to represent the input patterns and then will find matches to the learned patterns by calculating the amount of resonance due to proximity of the input pattern to each of the stored prototypes that represent the learned information. In this case where the system is re-using the same MCI IDs for all mipping, the Fuzzy ART network is seeded with only neurons that have their hyper-dimensional centers at locations corresponding to settings of the infrared material parameters for a single or set of MCI codes. Then, as each mipping combination is presented to the network, one of the seeded MCI neurons will have the highest resonance, and will be selected as being the closest representation of the presented set of MCI numbers.

During phase 1 training, patterns are learned with high vigilance (vigilance=1.0) in order that the neural network 126 learn the inputs exactly. In this example, there are 118 physical parameters for each MCI code, with some of them spectral in nature. As this phase of training proceeds, a training pattern and the name of the material it represents are presented to the neural network 126 so that it "learns" the pattern completely in one neuron, and puts the respective ID of the material on a list it maintains for each neuron. If two input patterns have the same exact weights then both of their IDs are added to a list for a single neuron.

Figure 6:
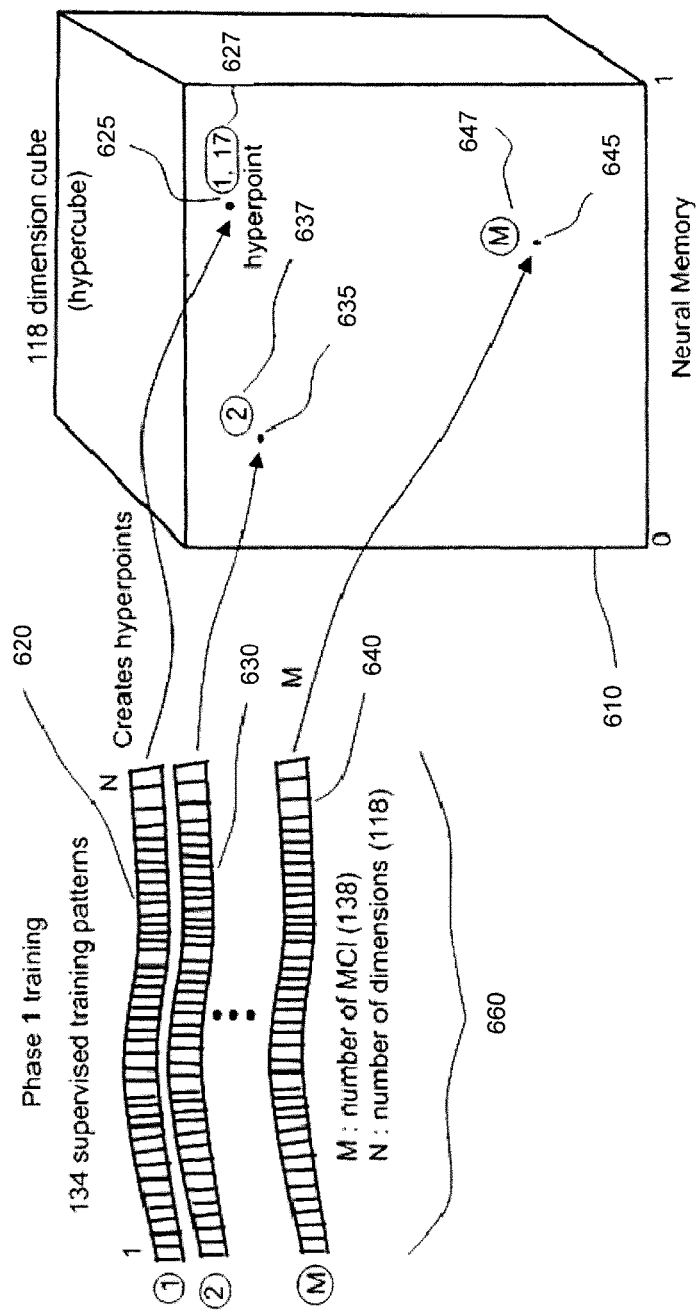
FIG. 6 is a pictorial representation of a first training operation that creates hyper-points within a classification space.

The resulting exemplars that are produced by phase 1 training consist of hyper-points in multidimensional neural memory, as is depicted in FIG. 6 (memory 610). Neural net training allows the neural memory 610 to contain all the learned information for the input patterns {620, 630, 640}. For the present embodiment, the neural memory is a 118-dimension hypercube, where each dimension consists of a floating-point numerical range of [0 . . . 1], which is assured by the previously discussed normalization of MCI data. Accordingly, each dimension fits into a [0 . . . 1] range without going above 1 or below 0, and thus no information is lost.

In the phase 1 training, the input patterns {620, 630, 640} are applied one at a time, with all dimensions in one pattern being applied at once in parallel. Neurons are created for each new pattern that is presented, as long as it is not a duplicate of a previously-presented pattern. Since each phase 1 pattern is an exemplar, a single 'crisp' hyperpoint, and is meant to just create and code its own neuron, the resulting artifacts in the neural memory are represented as hyper-points. In one embodiment, the hyper-points are 118-dimensional points. In FIG. 6, it is seen that training pattern 630 creates neuron 635 (tagged with identifier 637 and containing the ID of the training pattern 630) which in this case is labeled "2". Similarly pattern 620 creates neuron 625, coding it with its pattern and tagging it 627 with its name "1." However, because the material named "17" was identical to the material named "1," material "17" also is represented by neuron 625, and its ID is added to the list of material codes represented by that neuron. All neurons are created in this way and there is no spare neuron.

In the manner of Fuzzy Adaptive Resonance Theory neural network training, the input pattern is complement encoded, as follows:

Input pattern is a, where: $a = (a_1, a_2, \ldots, a_M)$

In this mipping example, M=118 for 118 dimensions. The input pattern is complement encoded to get the neural net input pattern. The complemented $a_1$ is $$a_1^c = 1 - a_1; \quad \text{Eq. (1)}$$

and the input vector becomes:

$$I = (a, a^c) \quad \text{Eq. (2)}$$
$$= (a_1, a_2, \ldots, a_M, a_1^c, a_2^c, \ldots, a_M^c).$$

Since M=118 in the application, the total number of dimensions in I is 2*M=236. Initially, there are no neurons. Since the vigilance is set so high, the neural network 126 will only code hyper-points (as oppose to hyper-rectangles) as may have otherwise occurred when using a lower vigilance. Vigilance, $\rho$, is a Fuzzy ART term that is defined in the following manner:

$$\rho = \frac{|I \wedge w|}{|I|} \quad \text{Eq. (3)}$$

where the $\wedge$ operator means to take the fuzzy Min of the two quantities, in this case it refers to taking the fuzzy Min of each dimension separately in the $I \wedge w$ term. The fuzzyMin of a scalar is $$x \wedge y = \min(x,y) \quad \text{Eq. (4)}$$

The norm brackets |·| indicate a sum across of the entire vector, as in $$|x| = \Sigma_{j=1}^{M} x_j \quad \text{Eq. (5)}$$

where the number of components in the vector is indicated by M.

The weight vector, w, describes the long-term memory template that is stored in each neuron. It consists of a pair of vectors, u and v, describing the 'lowest' corner and the 'highest' corner of the hyper-rectangle that has been learned by that neuron to represent a set of data in the training set, where $$w = (u, v^c) \quad \text{Eq. (6)}$$
$$= (u_1, u_2, \ldots, u_M, v_1^c, v_2^c, \ldots, v_M^c)$$

Figure 7:
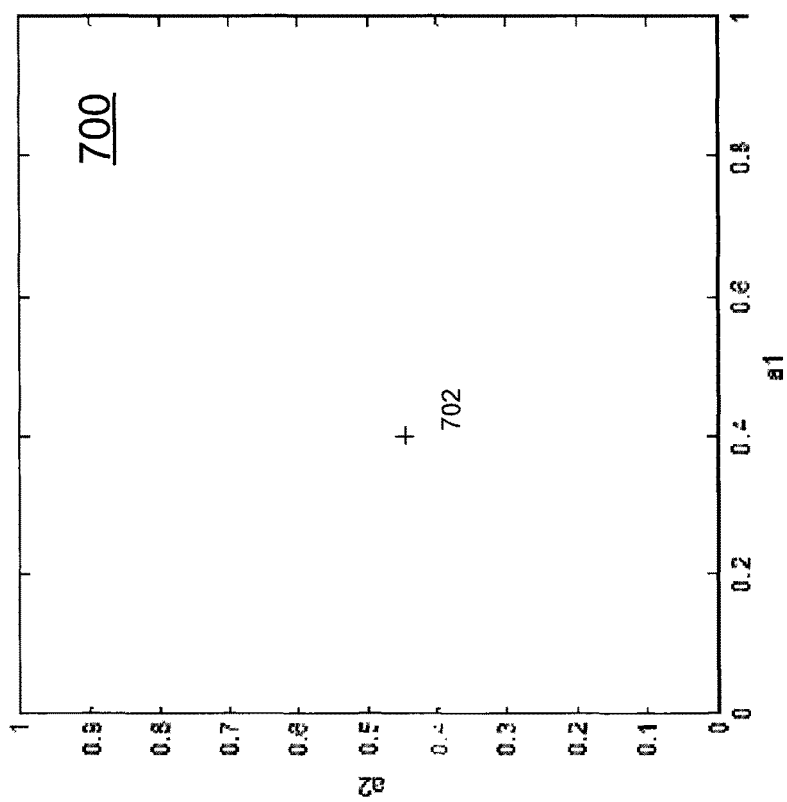
FIG. 7 is a pictorial example of a classification point within two-dimensions of a classification space.

At phase 1 programming, the maximum vigilance, 1.0, occurs only for a pattern that exactly matches a stored template. The only way to achieve $\rho=1.0$ is if the neuron only has a single point and that the incoming information is in exactly the same location of the point. For example, if the input pattern is $$a = (0.4, 0.45) \quad \text{Eq. (7)}$$

representing a single point in a 2-d coordinate system, as seen in FIG. 7 as the single point 702, then the input pattern is:

$$I = (a, a^c) \quad \text{Eq. (8)}$$
$$= (0.4, 0.45, 0.6, 0.55)$$

If this programs the neuron such that it is the only pattern represented by the neuron, then w=I, and $$\frac{|I \wedge w|}{|I|} = \frac{|(0.4, 0.45, 0.6, 0.55)|}{|(0.4, 0.45, 0.6, 0.55)|} = \frac{2}{2} = 1 \quad \text{Eq. (9)}$$

Any other point would not have a vigilance of 1.0. For instance if $$\breve{a} = (0.4, 0.46) \quad \text{Eq. (10)}$$

yielding $$\breve{I} = (\breve{a}, \breve{a}^c) \quad \text{Eq. (11)}$$
$$= (0.4, 0.46, 0.6, 0.54)$$

and using the same w having the weights from having had been trained with the pattern I from Eq. (8), which is:

$$w = (u, v^c) \quad \text{Eq. (12)}$$
$$= (0.4, 0.45, 0.6, 055)$$

the resulting vigilance is then:

$$\rho = \frac{|\breve{I} \wedge w|}{|\breve{I}|} = \frac{|(0.4, 0.45, 0.6, 0.54)|}{|(0.4, 0.45, 0.6, 0.55)|} = \frac{1.99}{2} = 0.995 \quad \text{Eq. (13)}$$

and the neuron will not expand to code the new information because the vigilance has to equal or exceed the vigilance threshold of 1.0 in phase 1, but in this case only equals 0.995.

Figure 5:
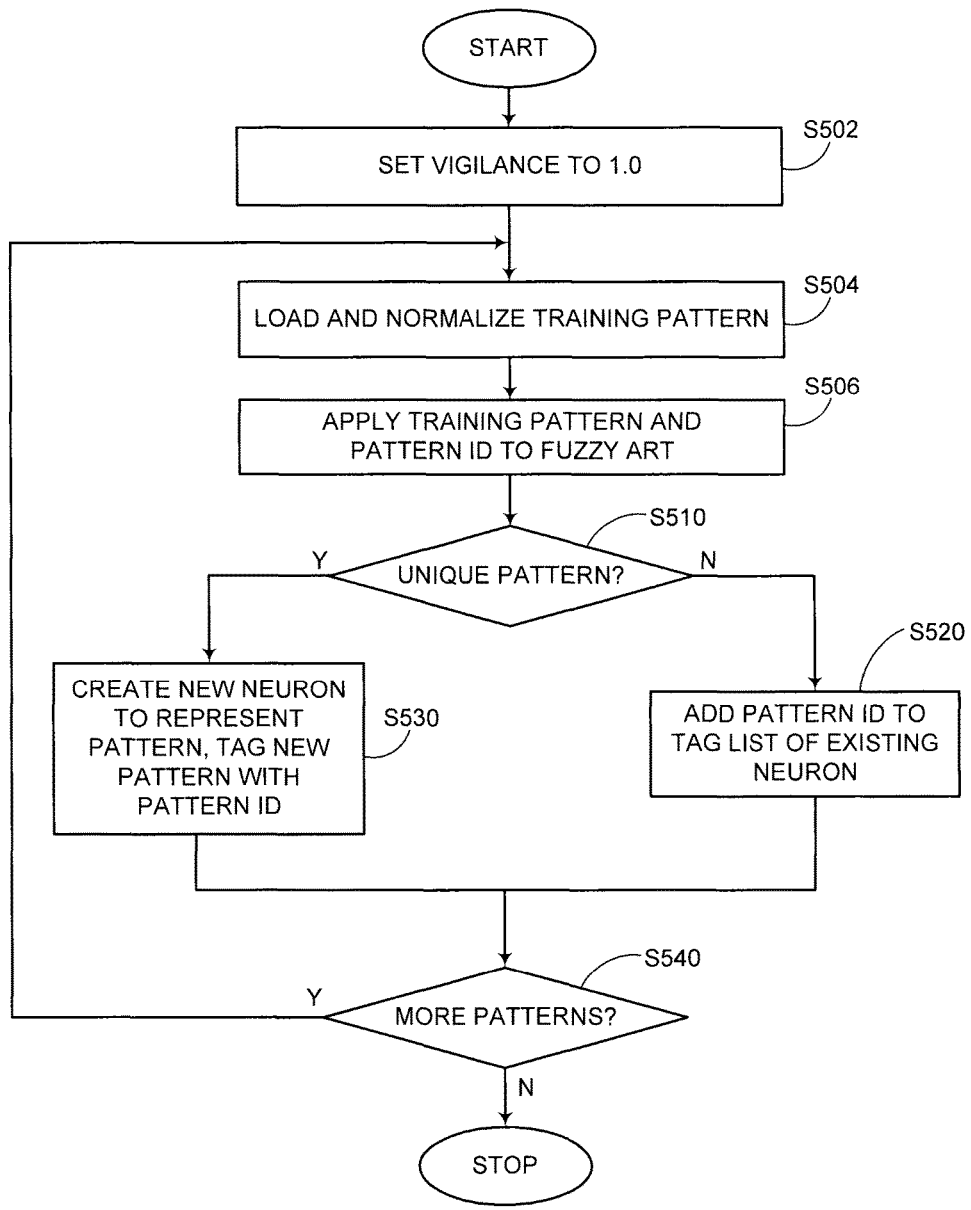
FIG. 5 is a flowchart outlining an example set of operations for performing a first training operation that creates hyper-points within a classification space.

FIG. 5 is a flowchart outlining phase 1 training. While the below-described steps are described as occurring in a particular sequence for convenience, it is noted that the order of various operations may be changed from embodiment to embodiment. It is further noted that various operations may occur simultaneously or may be made to occur in an overlapping fashion. The process starts in S502 where vigilance of a fuzzy ART is set to one. In S504, a training pattern (i.e., MCI data for a given material) is loaded/input and normalized. In S506, the training pattern along with its respective ID is applied to the Fuzzy ART. In S510, a determination is made as to whether the training pattern is unique or redundant. If the training pattern is unique, control continues to S530; otherwise, control continues to S520.

In S530, a new neuron is created to represent the pattern loaded in S504 and tagged with a pattern ID. Control continues to S540.

In S520, the ID of the non-unique/redundant pattern loaded in S504 is added to a tag list of an appropriate existing neuron. Control continues to S540.

In S540, a determination is made as to whether there are more patterns/MCIs to be learned. If there are more patterns, control jumps back to S504; otherwise, the operation of FIG. 5 stops.

Again returning to FIG. 1, after the phase 1 circuitry 140 has completed its initial training, the phase 2 circuitry 150 then performs a second set of training operations.

Phase 2 Training:

After the neuron exemplars have been created as hyper-points, phase 2 training is performed in order to expand the representation of the neurons with exposure to all the possible combinations of materials taken r at a time. At this point, new materials may be created if synthesis of materials is desired. However, the use of existing materials will be described first.

In Phase 2 training, the vigilance threshold, $\rho_t$, is reduced (e.g., $\rho_t = 0.6$) so that the existing neurons can update their weight vectors to encompass a range of values in the hyper-dimensional classification space of the neural network 126, instead of just being coded as a single exemplar hyper-point. In practice, the calculated vigilance of a pattern with respect to a given neuron's long term weights, w, has to exceed the vigilance threshold before that neuron may be modified.

Again, the large set of combined materials is generated, with N=the number of materials and r=the number of materials to combine with re-use but irrespective of order. With N=134 materials and r=4 combined materials in one material being mipped, there are $$\binom{r+N-1}{r} = 14{,}043{,}870$$

input patterns to be considered.

The input patterns must be normalized before they are applied to the neural net. The normalization values per dimension that were found earlier can be used again in this step to ensure that all the inputs are normalized in the same way, to allow correct comparisons to be made in the neural memory.

A substantial difference in this phase of training versus that in phase 1 is that no new neurons are allowed to be created when operating in existing-materials mode. In contrast, when operating in a material synthesis mode, new neurons may be created.

In the phase 2 existing-materials only training mode, material combinations are presented one by one to the neural network 126, and the neural network 126 tests the activation of all the neurons to find the neuron with the highest activation. Activation, T, is defined as $$T = \frac{|I \wedge w|}{\beta + |w|} \quad \text{Eq. (14)}$$

where β is a choice parameter that helps to add hysteresis in the choice to avoid starting up new neurons that are too close to previously learned neurons, and a generally used value is β=0.01.

When the neuron having the highest activation is determined, the neural network 126 tests the vigilance of the neuron in representing the new pattern. If the vigilance surpasses the vigilance threshold, then the neuron is adjusted to include the new information by storing the fuzzy min of each long-term weight dimension versus the input-pattern dimension value. If the vigilance value is not satisfied, then the next-most-active neuron is tested, and on and on until there are no more pre-committed, already programmed, neurons left, and then either a new neuron is created, if operating in the appropriate mode, or the next input pattern is tried for programming the neural network 126 while the current pattern is dropped. Having a dropped pattern may acceptable because, in the neural net use stage, the activations are checked again, and most distributed neurons will have activity to any input pattern, except for the single case with a neuron having a hyper-point at all zero responding to an incoming pattern of all ones.

Finding the activation follows as:

$$T = \frac{|I \wedge w|}{\beta + |w|} \quad \text{Eq. (15)}$$

$$= \frac{|(0.3, 0.33, 0.7, 0.67) \wedge (0.4, 0.45, 0.6, 0.55)|}{\beta + 0.4 + 0.45 + 0.6 + 0.55}$$

-continued $$= \frac{|(0.3, 0.33, 0.6, 0.55)|}{0.01 + 0.4 + 0.45 + 0.6 + 0.55}$$

$$= \frac{0.3 + 0.33 + 0.6 + 0.55}{2.01}$$

$$= 0.88557$$

If this neuron was chosen as having the highest activation, then the vigilance will be calculated, as in:

$$\rho = \frac{|I \wedge w|}{|I|} \quad \text{Eq. (16)}$$

$$= \frac{|(0.3, 0.33, 0.7, 0.67) \wedge (0.4, 0.45, 0.6, 0.55)|}{0.3 + 0.33 + 0.7 + 0.67}$$

$$= \frac{|(0.3, 0.33, 0.6, 0.55)|}{2}$$

$$= 0.89$$

If the threshold vigilance is 0.6, then this vigilance of 0.89 is higher than the threshold vigilance, and thus the neuron can represent the new input pattern. Accordingly, the new pattern is coded into the neuron. It can be coded slowly if the learning rate is low, but if the learning rate is set very high, it may learned completely the first time presented. The new stored long-term weight vector for this neuron, with fast learning, is then $$w = I \wedge w \quad \text{Eq. (17)}$$

$$= (0.3, 0.33, 0.6, 0.55)$$

$$= (u, v^c)$$

Figure 10:
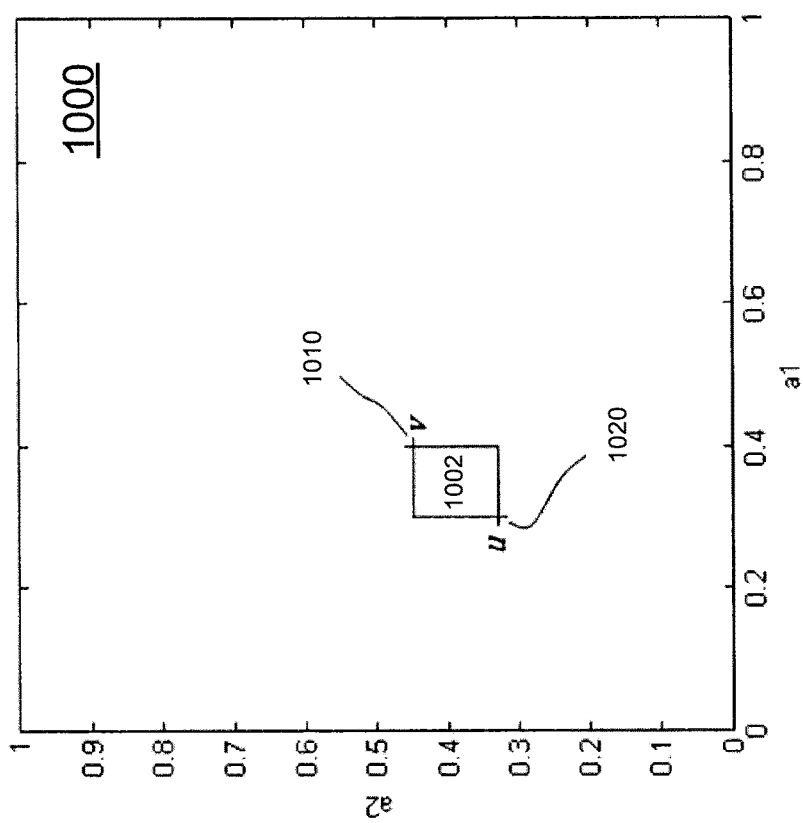
FIG. 10 is a pictorial example of a classification area embedded within two-dimensions of a classification space.

The extents of the rectangle represented by w can be found from its representation in the form of $(u, v^c)$, where:

$$u=(0.3, 0.33)$$

$$v^c=(0.6, 0.55)$$

and hence $$v = (1 - 0.6, 1 - 0.55)$$

$$= (0.4, 0.45)$$

having a graphical representation as shown in FIG. 10 where a rectangle 1002 is shown encompassing the area within which a point would have the highest activation, from u 1020 to v 1010.

This process continues through all the combinations of materials. If a neuron is a close-enough match, it is coded with the new information. In some cases the new combination may fall directly inside the hyper-rectangle for an existing neuron, and no changes would have to be made to the neuron. However, on other cases, there will be no sufficiently-closely-matching neuron, and no neuron will be programmed assuming that the existing-material only mode is used.

In contrast, if the operational mode is set such that new neurons (and thus new intermediate materials created) can be created, then a new neuron would be created. The amount of acceptable vigilance can be adjusted to ensure that only a certain number of total neurons are created in phase 2, so that the total number of IR materials, original and synthetic, stays within a predetermined or otherwise desired boundary.

Figure 9:
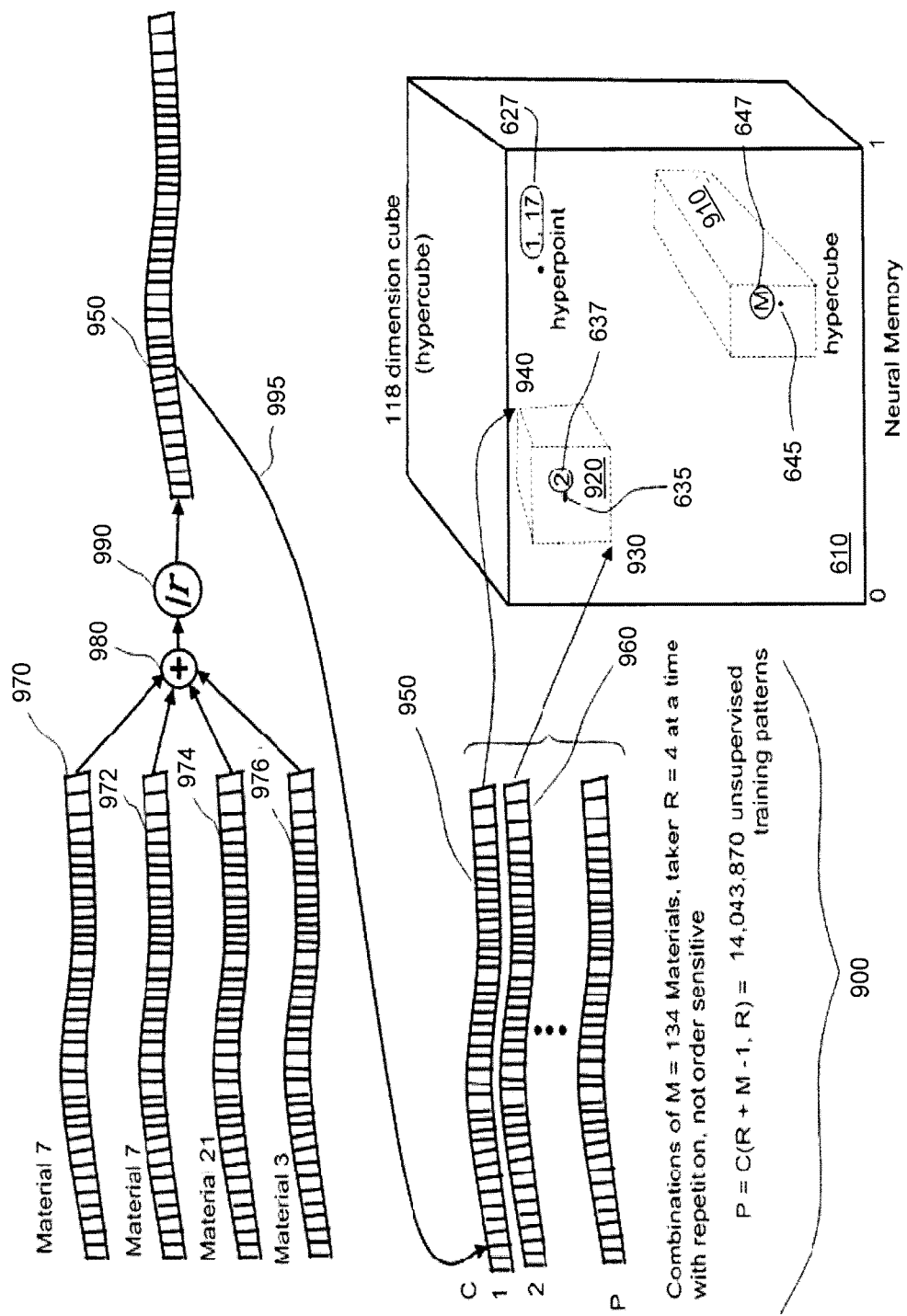
FIG. 9 is a pictorial representation of a second training operation that creates hyper-rectangles within a classification space.

FIG. 9 illustrates the result of presenting the unsupervised training patterns to the neural network 126 in phase 2 training. This type of training can be considered to be that of a self-organizing (or unsupervised) training contrasting with the supervised training performed in phase 1. In the example depicted in FIG. 9, no new neurons were created, and the neural network 126 is forced to contain all of the new learned information within the material-coded neurons that were originally created in phase 1. A set of P patterns (item 900) is presented to the neural network 126, where $$= \binom{r+M-1}{r},$$

and r=number of materials combined, with M=total number of materials, where the materials may be combined with re-use irrespective of order. In the case where M=134, and r=4 materials, then P=14,043,870 materials to be presented to the neural net.

FIG. 9 depicts the combination of an instance of Material 7 (item 970), another instance of Material 7 (item 972), an instance of Material 21 (item 974), and an instance of Material 3 (item 976). In this case r=4 and there are four materials added (item 980) together and averaged by dividing by r (item 990). This creates material 950, which becomes (item 995) one of set of P materials 900.

As the set of P materials 900 is presented to the neural network 126 one by one, neurons may resonate with the input pattern. In the vernacular of Fuzzy ART, the resonance occurs when the vigilance of the match between the neuron long-term memory weights and the incoming compliment-encoded pattern is higher than the vigilance threshold.

The neuron with the highest activation (assuming a sufficiently high resonance) may expand to encompass the new neuron, using the fast adaptation method discussed above. Then what used to be a hyper-point 635 may expand to a hyper-rectangle 920 if the input pattern 950 resonates with that neuron 635 adding point 940 to expand the neuron's hyper-point into a hyper-rectangle 920.

The result of the phase 2 training is that the neurons are expanded to better represent the universe of material combinations that may be presented to the network, thus helping to provide more accurate classifications of material combinations. When used in the material synthesis mode, new neurons would be created to represent different material combinations. These new neurons would be created if there was no neuron found that would satisfactorily represent, with high enough vigilance, a given material combination when comparing it to the initial set of exemplar-trained neurons, or any of their combinations.

During the training with the combinations, to avoid any bias due to the order in which the combinations are presented to the neural network, it may be helpful to use a lower value for the learning rate, $\gamma$, instead of the value of $\gamma=1$ that lead to Eq. (18) below.

$$w^{new} = \gamma *(I \wedge w^{old}) + (1-\gamma) w^{old} \qquad \text{Eq. (18)}$$

In this case, the phase 2 training would be repeated multiple times in order to fully train the neurons with the completion of training detected when either no neurons change or change below a small threshold.

Notice that for FIG. 9, the material codes 627, 637, 647, all stay the same as the neuron learns new information. In this way only the original materials will become the selected output neuron when the neural net is put into operation. In the case of when the neural network is used to synthesize materials that have intermediate infrared properties, the neurons will be given new identification numbers that are not the same as any of the identification numbers from the original set of materials presented in phase 1 training.

Figure 8:
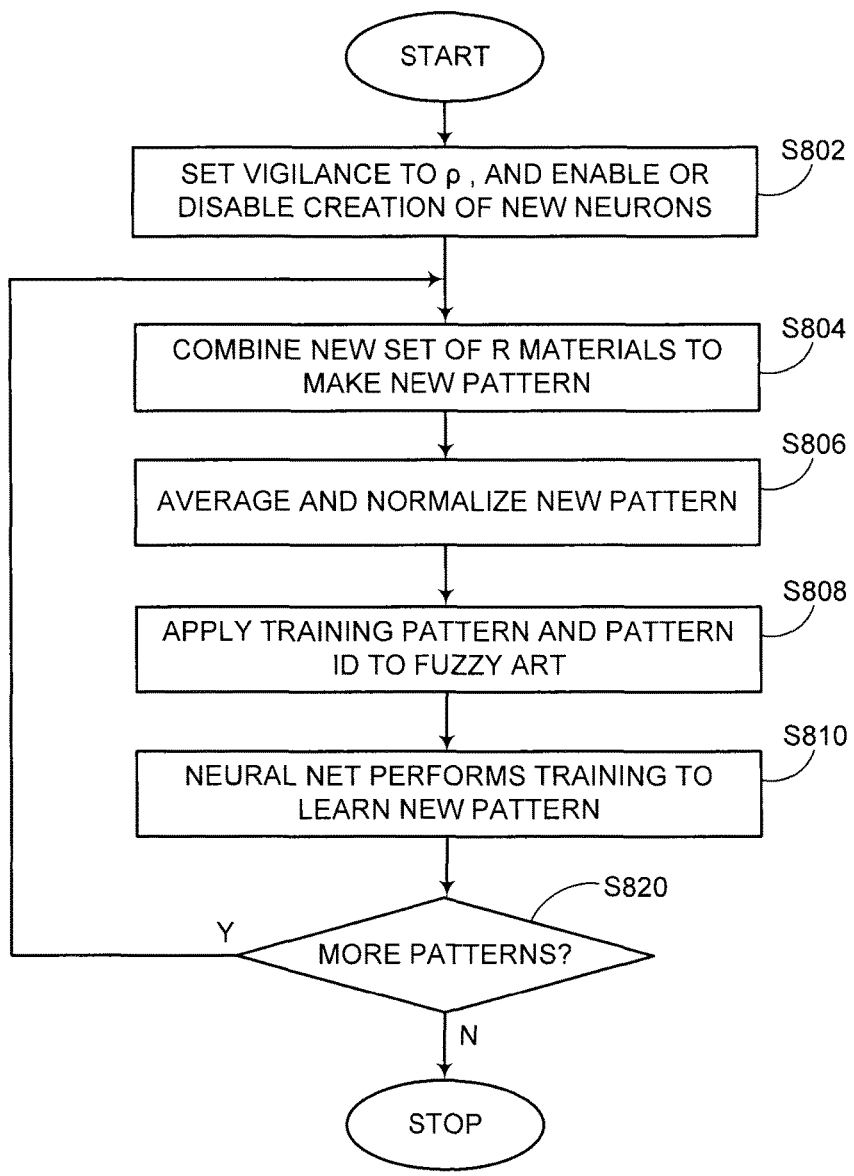
FIG. 8 is a flowchart outlining an example set of operations for performing a second training operation that creates hyper-rectangles within a classification space.

FIG. 8 is a flowchart outlining phase 2 training. While the below-described steps are described as occurring in a particular sequence for convenience, it is noted that the order of various operations may be changed from embodiment to embodiment. It is further noted that various operations may occur simultaneously or may be made to occur in an overlapping fashion. The process starts in S802 where vigilance of a fuzzy ART is set to $\rho$, and the creation of new neurons is enabled or disabled. In S804, a set of R materials is combined to create a new pattern, and in S806, the new pattern is normalized.

In S808, the new pattern is applied to the neural network along with the pattern ID (optional) depending whether training is supervised or unsupervised, whereafter in S810 the neural network is trained to learn the new pattern. In S820, a determination is made as to whether there are more patterns to be learned. If there are more patterns, control jumps back to S804; otherwise, the operation of FIG. 8 stops.

Again returning to FIG. 1, after the phase 2 circuitry 150 has completed its initial training, the neural network 126 may be used by the mipping circuitry 160.

How the Neural Network is Used:

Once the neural network 126 has been exposed to all the material combinations, then the weights will have been determined for all the neurons, and they may be saved to disk or some form of long-term, persistent memory. This weight file will only contain weight information for as many materials are allowed to exist in the network. For instance, if 134 materials were input to the network for training, even though more than 14 million training patterns may have been produced, only a maximum of 134 neuron weight sets will be produced. These weights may then be used in mipping by loading them into an instance of the same neural network, and operating it in the run mode, also called the 'use', exploitation, or the discovery mode. In this process, a set of r materials are combined, where r=4 in one embodiment. The combination is applied to the network. The neural network 126 checks all the activations of all the neurons and chooses the one with the highest activation as the best representation of the combined material, and that MCI code is returned as the output, mipped, value for that material combination. In the case where there are multiple MCI codes, one that matches one of the MCI codes in the initial set of r combined MCI codes is returned as possible.

In the case where the material number returned must be the same as one of the materials that is in the combination, only the neurons that contain one of the material IDs from the set of r materials presented for mipping are tested for activation.

In operation, a set of r materials is selected, combined and averaged and normalized for presentation to the neural network 126. The neural network 126 will then loop through all the neurons to find the neuron with highest activation. If only original materials are considered, then only the neurons that were tagged with the material IDs from the r materials currently being mipped will be checked for activation, as this saves many unneeded calculations.

If synthetic materials are used, then any material that is selected by the neural net as being most similar to the combined incoming material set will be examined. After the most active neuron is found, the material id will be returned to the calling program, but if the system is only using pre-existing materials, then the material ID that is returned will be one that matches one of the set of r materials that were combined before being applied to the network.

However, in other embodiments, each output/classification can vary to be, for instance, a material ID from a subset of the pre-existing infrared materials or from an expanded set of "synthesized materials." In synthesized-materials mode, new materials may be made by the neural network to provide intermediate materials that better represent combinations of material in a mip, the mip being a combination of multiple materials that is being represented by a single material. A set of neurons would be automatically spread across the neural memory to represent the combined feature sets of the incoming set of r materials, through the operation of the neural network. The neural network will automatically create neurons when needed, in order to represent the combined materials, when they do not resonate with any of the existing material-coded neurons. Then these new neurons will represent a new material that may be used as the mip material. Each newly-created material would be a crisp hyper-point that represents the material properties exactly. After being exposed to all the training combinations in phase 2 unsupervised learning, the neuron will generally have a hyper-rectangular fuzzy prototype, or weight vector, w, consisting of ranges in different dimensions that need to be defuzzified in order to directly be used as a crisp material having a single-valued, or crisp, value for each of the dimensions it uses to describe features or physical aspects of the material. The defuzzification process for this application could be to just take the average value in each of the dimensions. Each dimension will have a range that is specified by its u and v values, in their appropriate locations in the neuron weight vector. The low end of the range in that dimension is the value of u and the upper end of the range is $v=(1-v^c)$, with the output, synthesized defuzzified result, sdf, being $$sdf = \frac{(u + (1 - v^c))}{2} \qquad \text{Eq. (19)}$$

The sdf values would be processed on a dimension by dimension basis, and used as the new material property in the resulting mip material. An alternative defuzzification method would be to find the mean of the distribution of learned values in each dimension of the synthesized material, and use that as the defuzzified result for that dimension.

In some cases, one dimension of the neuron may have more meaning than another, for instance if one dimension is temperature, while the other is just a single spectral line from a 200-point spectrum. In these cases it can be helpful to decrease the vigilance weight of the minor property to be less than that of the major property, and hence influence the matching strength less for the lesser, or minor property, than for the major property.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A mipping system, comprising:
processing circuitry configured to:
receive combinations of a plurality of pixels N at a time, each pixel having material codes directed to respective materials of the pixels, where the material codes relate to infrared properties of the respective materials sensed by a sensor of the mipping system, and N is a positive integer greater than 1; and
train an artificial neural network having a classification space by providing respective neurons for each unique combination of material codes, and condition the artificial neural network so that the respective neurons activate when presented with their unique of material code combinations;
calculate an average value of the material codes;
replace a stored maximum value with the average value when the average value exceeds the stored maximum value;
replace a stored minimum value with the average value when the average value falls below the stored minimum value; and
normalize the material codes using the replaced maximum and minimum values;
train the artificial neural network starting with a vigilance setting of a first value; and
when the artificial neural network reaches a state in which no more new patterns are to be learned by the artificial neural network, adjust the vigilance setting of the first value to a second value that is lower than the first value and greater than zero, and retrain the artificial neural network with the vigilance setting of the second value.

2. The system of claim 1, wherein each material code has P dimensions, where P is a positive integer greater than three, and the processing circuitry includes normalization circuitry that normalizes each material code such that all dimensions of the material codes have a range from 0.0 to 1.0.

3. The system of claim 1, wherein each material code has P dimensions, where P is a positive integer, and dimensions of the material codes include at least a material density, a material emissivity, a specific heat, a thermal conductivity, and a reflectivity for a plurality of different infrared spectral ranges.

4. The system of claim 1, wherein the processing circuitry is further configured to train the artificial neural network starting with the vigilance setting of the first value for an initial phase of the training during which a neural memory with multi-dimensions stores the respective neurons for a plurality of input patterns that are applied one input pattern at a time, the one input pattern being applied at once in parallel with all the multi-dimensions of the neural memory.

5. The system of claim 4, wherein the processing circuitry includes:
phase one processing circuitry that trains the neural network using a supervised training technique and that employs a vigilance setting of 1.0 so as to provide hyper-point classifications within the classification space.

6. The system of claim 5, wherein the processing circuitry further includes:
phase two processing circuitry that further trains the neural network after the phase one processing circuitry performs its training, the phase two processing circuitry employing another vigilance setting less than 1.0 so as to provide hyper-rectangle classifications within the classification space.

7. The system of claim 6, wherein the phase two processing circuitry uses at least non-supervised training.

8. A mipping method, comprising:
receiving combinations of a plurality of pixels N at a time, each pixel having material codes directed to respective materials of the pixels, where the material codes relate to infrared properties of the respective materials sensed by a sensor of a mipping system, and N is a positive integer greater than 1;
training an artificial neural network having a classification space by providing respective neurons for each unique combination of material codes, and conditioning the artificial neural network so that the respective neurons activate when presented with their unique of material code combinations;
calculating an average value of the material codes;
replacing a stored maximum value with the average value when the average value exceeds the stored maximum value;
replacing a stored minimum value with the average value when the average value falls below the stored minimum value; and
normalizing the material codes using the replaced maximum and minimum values;
training the artificial neural network starting with a vigilance setting of a first value; and
when the artificial neural network reaches a state in which no more new patterns are to be learned by the artificial neural network, adjusting the vigilance setting of the first value to a second value that is lower than the first value and greater than zero, and retraining the artificial neural network with the vigilance setting of the second value.

9. The method of claim 8, wherein each material code has P dimensions, where P is a positive integer greater than three, further comprising:
normalizing each material code such that all dimensions of the material codes have a range from 0.0 to 1.0.

10. The method of claim 8, wherein each material code has P dimensions, where P is a positive integer, and dimensions of the material codes include at least a material density, a material emissivity, a specific heat, a thermal conductivity, and a reflectivity for a plurality of different infrared spectral ranges.

11. The method of claim 8, wherein the neural network uses a Fuzzy Adaptive Resonant Theory ("Fuzzy ART") paradigm.

12. The method of claim 11, wherein processing includes:
phase one processing that trains the neural network using a supervised training technique and that employs a vigilance setting of 1.0 so as to provide hyper-point classifications within the classification space.

13. The method of claim 12, wherein processing further includes:
phase two processing that further trains the neural network after the phase one processing performs its training, the phase two processing employing a-another vigilance setting less than 1.0 so as to provide hyper-rectangle classifications within the classification space.

14. The method of claim 13, wherein the phase two processing uses at least non-supervised training.

15. An imaging device, comprising:
circuitry configured to process a plurality of input pixels taken N at a time using a pre-trained artificial neural network to create an output pixel for each N input pixels, wherein the input pixels and the output pixel all include infrared information produced by a sensor, each pixel having a respective material code chosen from material codes of a classification space, wherein N is a positive integer more than 1, wherein (i) an average value of the material codes is determined, (ii) a stored maximum value is replaced with the average value when the average value exceeds the stored maximum value and a stored minimum value is replaced with the average value when the average value falls below the stored minimum value, (iii) the material codes are normalized using the replaced maximum and minimum values, the pre-trained artificial neural network is trained initially with a vigilance setting of a first value, when the pre-trained artificial neural network reaches a state in which no more new patterns are to be learned by the artificial neural network, the vigilance setting of the first value is adjusted to a second value that is lower than the first value and greater than zero, and the pre-trained artificial neural network is retrained with the vigilance setting of the second value.

16. The device of claim 15, wherein the input pixels and the output pixel all include more than three dimensions.

17. The device of claim 15, further comprising circuitry that assembles a plurality of output pixels to create a mipped infrared image.

18. The device of claim 17, wherein the artificial neural network includes a Fuzzy Adaptive Resonant Theory ("Fuzzy ART") paradigm.

19. The device of claim 18, wherein each material code has P dimensions, where P is a positive integer, and dimensions of the material codes include at least a material density, a material emissivity, a specific heat, a thermal conductivity, and a reflectivity for a plurality of different infrared spectral ranges.

20. An imaging method, comprising:
receiving a plurality of pixels that each include infrared information produced by a sensor and more than three dimensions, each pixel having a respective material code chosen from material codes of a classification space; and
processing the pixels using a pre-trained artificial neural network to create an output pixel having a material code of the classification space and the infrared information, wherein (i) an average value of the material codes is determined, (ii) a stored maximum value is replaced with the average value when the average value exceeds the stored maximum value and a stored minimum value is replaced with the average value when the average value falls below the stored minimum value, and (iii) the material codes are normalized using the replaced maximum and minimum values, the pre-trained artificial neural network is trained initially with a vigilance setting of a first value, when the pre-trained artificial neural network reaches a state in which no more new patterns are to be learned by the artificial neural network, the vigilance setting of the first value is adjusted to a second value that is lower than the first value and greater than zero, and the pre-trained artificial neural network is retrained with the vigilance setting of the second value.

21. The method of claim 20, wherein the output pixel includes more than three dimensions.

22. The method of claim 21, further comprising assembling a plurality of output pixels to create a mipped infrared image.

23. The method of claim 22, wherein the artificial neural network includes a Fuzzy Adaptive Resonant Theory ("Fuzzy ART") paradigm.

24. The method of claim 23, wherein each material code has P dimensions, where P is a positive integer, and dimensions of the material codes include at least a material density, a material emissivity, a specific heat, a thermal conductivity, and a reflectivity for a plurality of different infrared spectral ranges.

\* \* \* \* \*